United States Patent
Kemkemian et al.

(10) Patent No.: US 8,120,523 B2
(45) Date of Patent: Feb. 21, 2012

(54) METHOD OF ELIMINATING GROUND ECHOES FOR A METEOROLOGICAL RADAR

(75) Inventors: Stephane Kemkemian, Paris (FR); Stephane Guguen, Houilles (FR); Christian Chaure, Locmaria Plouzane (FR)

(73) Assignee: Thales, Neuilly sur Seine (FR)

( * ) Notice: Subject to any disclaimer, the term of this patent is extended or adjusted under 35 U.S.C. 154(b) by 482 days.

(21) Appl. No.: 12/473,880

(22) Filed: May 28, 2009

(65) Prior Publication Data

US 2010/0176984 A1 Jul. 15, 2010

(30) Foreign Application Priority Data

May 30, 2008 (FR) ...................................... 08 02984

(51) Int. Cl.
*G01S 13/95* (2006.01)
*G01S 7/292* (2006.01)
(52) U.S. Cl. .......... 342/26 R; 342/159; 342/162; 342/91
(58) Field of Classification Search ................ 342/26 R, 342/26 A–26 D, 159–162, 91–92
See application file for complete search history.

(56) References Cited

U.S. PATENT DOCUMENTS

| | | | | |
|---|---|---|---|---|
| 4,005,415 A | * | 1/1977 | Kossiakoff et al. ............. | 342/90 |
| 4,223,309 A | | 9/1980 | Payne | |
| 4,709,236 A | * | 11/1987 | Taylor, Jr. ..................... | 342/101 |
| 5,007,558 A | | 4/1991 | Allen et al. | |
| 5,262,782 A | * | 11/1993 | Rubin et al. ................. | 342/26 D |
| 5,311,183 A | | 5/1994 | Mathews et al. | |
| 5,469,168 A | * | 11/1995 | Anderson ................... | 342/26 D |
| 5,523,759 A | | 6/1996 | Gillberg | |
| 5,955,985 A | * | 9/1999 | Kemkemian et al. ......... | 342/159 |
| 6,456,226 B1 | * | 9/2002 | Zheng et al. ................. | 342/26 R |
| 6,563,452 B1 | * | 5/2003 | Zheng et al. ................. | 342/26 R |
| 6,717,545 B2 | * | 4/2004 | Dizaji et al. ..................... | 342/93 |
| 6,867,731 B2 | * | 3/2005 | Dizaji et al. .................. | 342/159 |
| 7,307,576 B1 | * | 12/2007 | Koenigs ....................... | 342/26 R |
| 7,339,519 B2 | | 3/2008 | Picard ........................... | 342/189 |
| 7,898,459 B2 | * | 3/2011 | Venkatachalam et al. .. | 342/26 R |
| 2008/0291082 A1 | | 11/2008 | Kemkemian | |
| 2010/0176984 A1 | * | 7/2010 | Kemkemian et al. ......... | 342/159 |

FOREIGN PATENT DOCUMENTS

DE 3924859 A1 1/1991
JP 10253753 A * 9/1998

* cited by examiner

*Primary Examiner* — John Sotomayor
(74) *Attorney, Agent, or Firm* — Stroock & Stroock & Lavan LLP

(57) ABSTRACT

The present invention relates to a method of eliminating ground echoes for a meteorological radar. The ground echoes being received from a predetermined area by a radar, the radar illuminating, for a predetermined number R of transmission recurrences, the area over a number P of distance cells, the method includes a step for calculating a spatial statistical parameter of the cluttered echoes received by the radar in response to the recurrences over an analysis path for distance cells, and a step to compare the spatial variation level of the spatial statistical parameter along the analysis path, the echoes being considered to be ground echoes when the level of said variation is greater than a predetermined threshold.

11 Claims, 4 Drawing Sheets

METHOD OF ELIMINATING GROUND ECHOES FOR A METEOROLOGICAL RADAR

Figure 1:
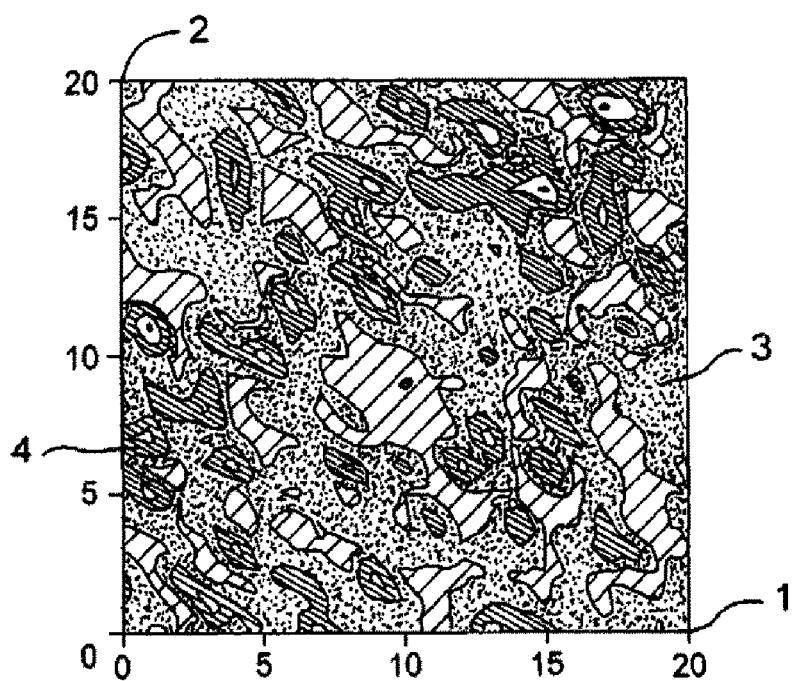

The present application claims the benefit of French patent application serial no. 0802984, filed May 30, 2008, which is hereby incorporated by referenced in its entirety.

The present invention relates to a method of eliminating ground echoes for a meteorological radar.

Air navigation seeks to avoid areas that are potentially dangerous from a meteorological point of view. One of the criteria commonly employed is based on the measurement, by a radar on board the aircraft, of the radiofrequency reflectivity of cloud masses. In practice, a high reflectivity is a sign of potential danger. This raw danger factor can be refined and weighted by introducing various parameters such as:

the distribution by volume and time of these reflectivity areas;

the temperature, the place, the season, the time of day or even the altitude for example.

One of the first objectives is to perform these measurements in the vicinity of the planned flight trajectory, or of the possible trajectories. In the case of a horizontal flight at cruising altitude, it primarily involves estimating this meteorological danger factor in the vicinity of a horizontal plane at the altitude of the aircraft carrying the radar. In reality, at high altitude, the hydrometeors that form the radar tracers are often frozen, and therefore backscatter weakly. A more sensitive measurement is obtained by lowering the observation elevation angle of the radar, so as to probe the lower layers of the cloud system, where the liquid hydrometeors are located. However, by targeting a negative elevation angle, or even a zero elevation angle in the presence of relief, the radar beam can intersept the ground and supply ground echoes, the power of which can be likened to that of a meteorological echo and so create a false alarm.

Some old generation on-board meteorological radars used to have a manual elevation angle control, the figure of movement then being moved manually by the pilot to obtain the best trade-off between good visibility of the so precipitations and minimal ground echo detection. This operation was performed on the basis of a visual analysis of the radar map available to the pilot. This method has been abandoned on new generation radars because:

it incurs an additional workload for the crew;

the setting must be constantly corrected to maintain the detection of the cloud masses at an optimal point;

the ignorance of the crew as to how the meteorological radar operates can lead to an inappropriate setting of the observation elevation angle and therefore to the failure to detect a dangerous area.

The new generation radars overcome these drawbacks by eliminating the manual adjustment of the observation elevation angle or angles and perform a volumetric analysis of the space. The situation is then one of the following:

either the angular extent elevation angle-wise of the area analyzed by the radar is very much greater than the elevation angle aperture of the antenna lobe, in the case of a radar equipped with a large antenna that therefore has a fine beam;

or the natural aperture of the antenna lobe is large and a particular device sets the observation elevation angle to an optimal elevation angle for the detection of the cloud masses, notably in the case of a radar equipped with small antennas.

More generally, on completion of a scan sequence, there is a set of signals with N angular directions examined, in elevation and in bearing, and with M distances corresponding to the distance cells of the radar. Within this set comprising N×M samples, it is possible for the result of the detection to comprise:

only the thermal noise;

only the original meteorological signal;

mostly the meteorological signal, and, in negligible quantity compared to the meteorological signal, the ground clutter;

mostly the ground clutter and, in negligible quantity relative to the ground clutter, the meteorological signal;

only the ground clutter.

It should be noted that, in all cases, the thermal noise is added to the other signals.

The conventional filtering techniques that use Doppler effect cannot be applied here because:

a meteorological tracer can have the same relative speed as that of a ground element;

the ranges sought lead to the use of a low pulse repetition frequency, which leads to a very low Doppler ambiguity which means that the ground echoes and the meteorological echoes cannot be reliably separated.

Known techniques for eliminating ground echoes, notably for airborne meteorological radars, are notably based on:

the use of a terrain database;

the analysis of the vertical profiles of received signal power as a function of observation elevation angle, using either, directly, the measured power profile or the power gradient between two sightings performed on at least two distinct elevation angles.

Regarding the use of terrain databases, such databases must be constantly updated and, moreover, these databases do not necessarily cover the entire globe with the required accuracy or they require a large storage volume and/or a search engine that is expensive to implement in the aircraft's radar. Furthermore, this method is sensitive to the installation bias of the radar on an aircraft and to the spurious effects of the propagation of the radiofrequency waves in the atmosphere due notably to undesirable curvatures.

Regarding the analysis of the vertical received signal power profiles, the methods used require the recognition of typical power variation signatures which can be held in check with particular meteorological signal profiles. Moreover, as stated previously, at least two distinct observation elevation angles are required, which can in some cases constitute a constraint.

One aim of the invention is notably to overcome the above-mentioned drawbacks. To this end, the subject of the invention is a method of eliminating ground echoes received from a given area by a radar, the radar illuminating, for a given number R of transmission recurrences, the said area over a number P of distance cells, the method comprising:

a step for calculating a spatial statistical parameter of the cluttered echoes received by the radar in response to the recurrences over an analysis path for distance cells and;

a step for comparing the spatial variation level of this statistical parameter along the analysis path, the echoes being considered to be ground echoes when the level of the said variation is greater than a given threshold.

The statistical parameter is, for example, calculated successively over a window centred on a distance cell, the window being a sliding window along the analysis path.

Advantageously, the analysis can be performed on a signal resulting from the temporal integration of the statistical parameters calculated successively over all the illuminated area, the level of variation of the integrated signal being compared to a given threshold, the temporal integration being, for example, calculated over all the R recurrences.

The calculated statistical parameter is, for example, any temporal average of the locally reflected power. It is notably possible to take a parameter other than the arithmetic power over the powers. The temporal average can be the received power average at the level of a distance cell.

In a particular embodiment, the temporal average power is calculated over all the distance cells of the sliding window.

Thus, advantageously, a radar parameter is exploited, for example the power, which is a random variable of space (the distance cells) and time (recurrences). Initially, the dependence on time is reduced by taking a temporal average, for each distance cell for example, of this radar parameter, power for example, which gives a variable X. Then, having reduced the temporal dependence of this variable X, a statistical parameter Y is calculated, this statistical parameter not being the power of the signal.

The statistical parameter is, for example, the quantity $Y_{icd}$ defined by the following equation:

$$Y_{icd} = \log\left(\frac{1}{Q}\sum_{i=-\frac{Q}{2}}^{\frac{Q}{2}} X_{i+icd}\right) - \frac{1}{Q}\sum_{i=-\frac{Q}{2}}^{\frac{Q}{2}} \log(X_{i+icd})$$

$X_{i+icd}$ being the temporal average power received at the level of the distance cell of order i+icd, Q being the number of successive distance cells over which the statistical quantity is calculated.

This statistical quantity $Y_{icd}$ can be calculated over the sliding window centred on the distance cell of order icd, Q being the number of distance cells in the window.

The analysis path is situated, for example, on the distance axis of the radar. This can also be a multidimensional path for which the variation is minimal.

Figure 2:
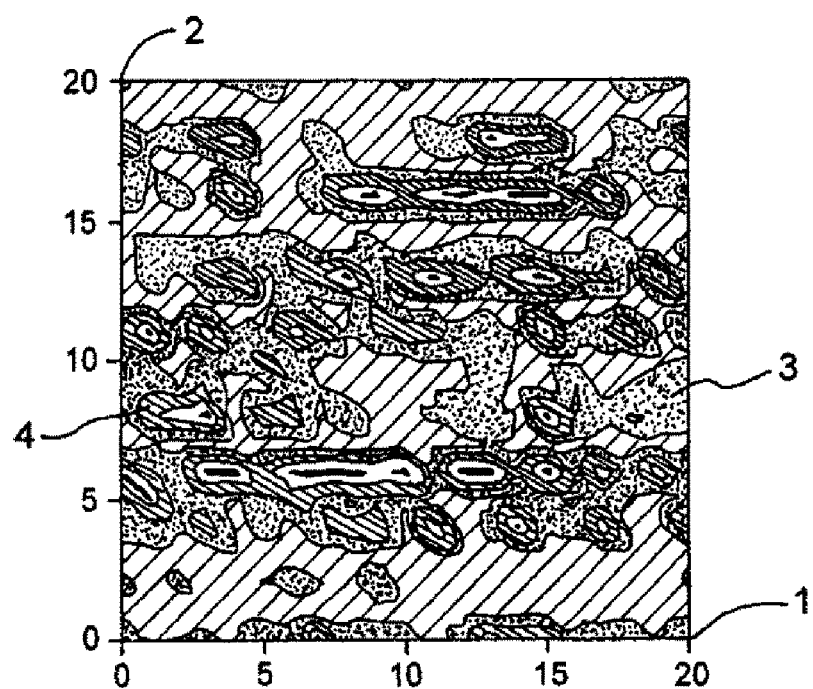
Figure 3:
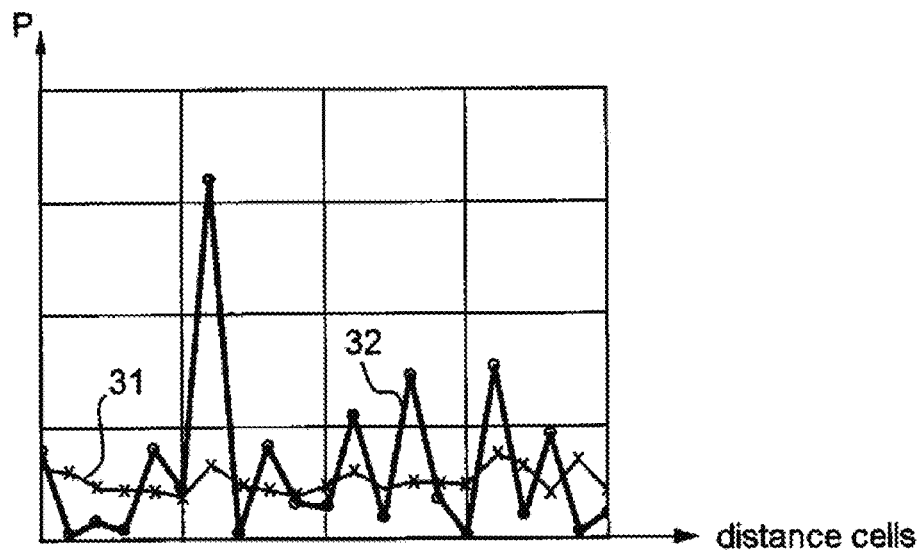
Figure 4:
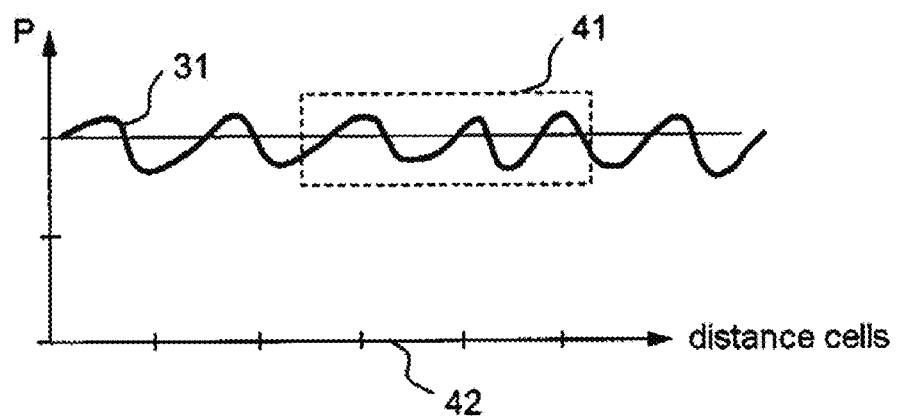
Figure 5:
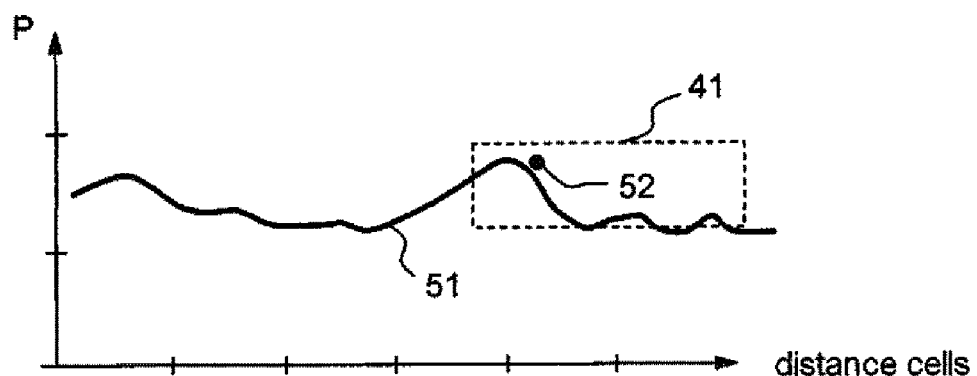
Figure 6:
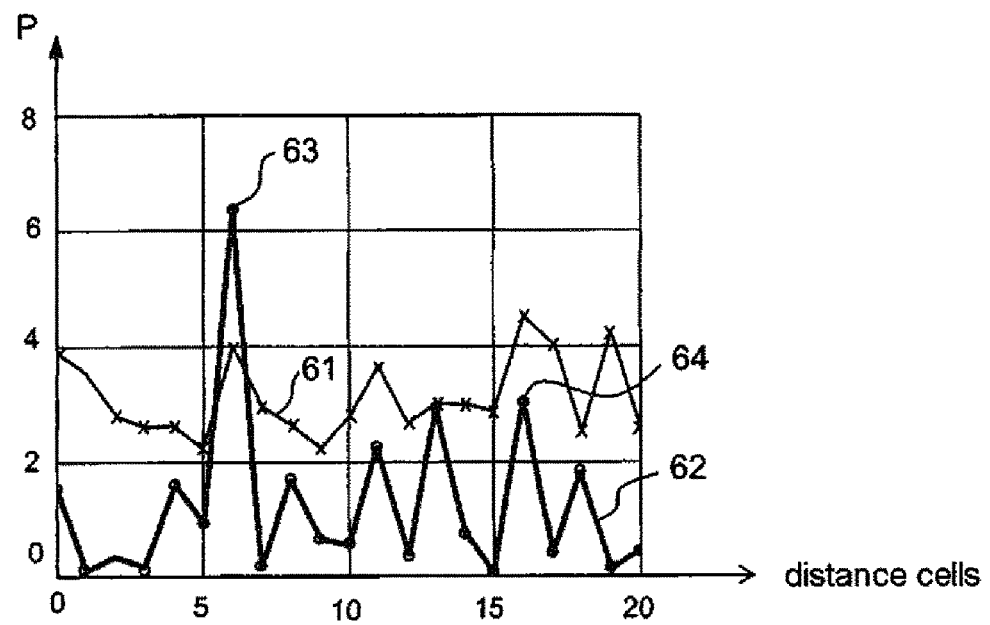
Figure 7:
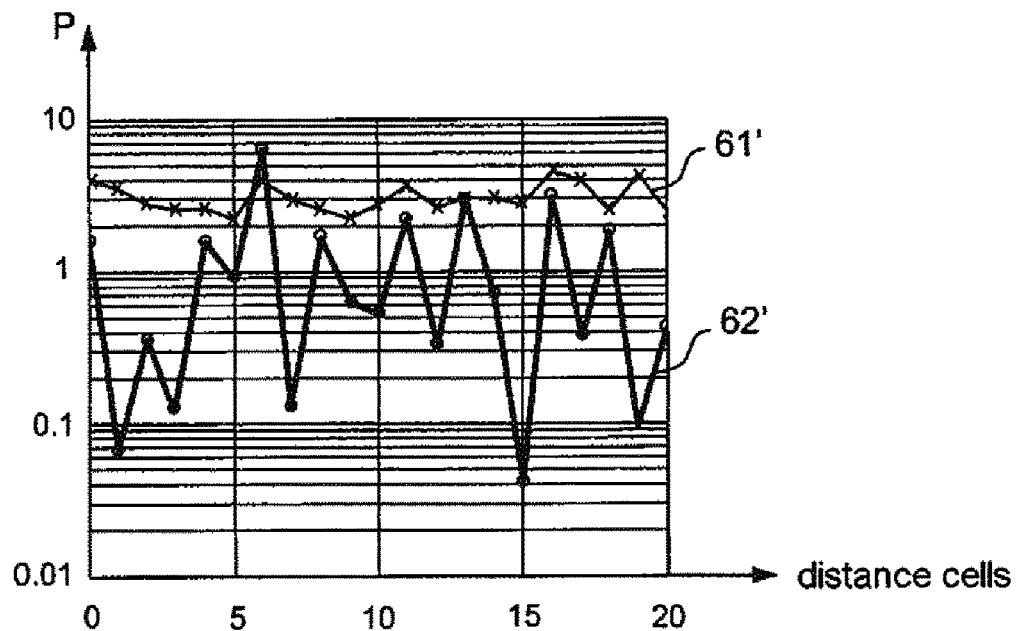
Figure 8:
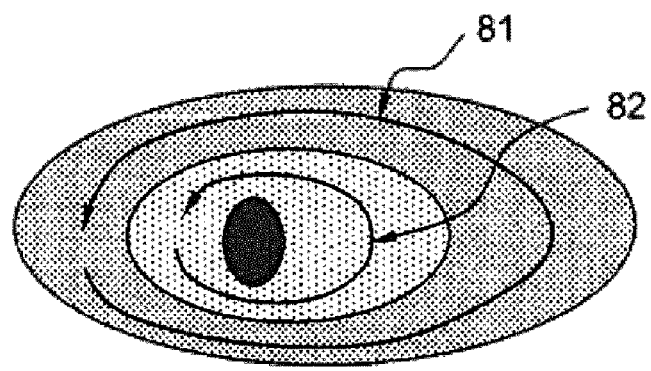

Other features and benefits of the invention will become apparent from the following description, given in light of the appended drawings which represent:

FIG. 1, an exemplary power distribution of a collection of signal samples received by a radar;

FIG. 2, an exemplary power distribution of a collection of received signal samples corresponding to the ground clutter;

FIG. 3, an illustration of the temporal average power for each distance cell;

FIG. 4, an illustration of the temporal average power as a function of the distance cells with a sliding window along the distance cells;

FIG. 5, an illustration of the backscattered power profile of a ground clutter as a function of the distance cells;

FIG. 6, an illustration of a power profile after a post-integration from radar recurrence to radar recurrence;

FIG. 7, an illustration of a profile of the preceding type in a logarithmic scale;

FIG. 8, exemplary distance cell paths for the analysis over which the analysis of the average power can be carried out.

FIG. 1 shows the power distribution of a collection of signal samples received by a radar in a two-dimensional array. To obtain this collection, it is assumed that the antenna of the radar illuminates a given area for a certain number of recurrences, and over a certain number of distance cells. A first dimension 1, which is temporal, corresponds to the recurrences of successive radar transmissions. The second dimension 2, which is spatial, corresponds to the distance cells. The different power levels are represented by different patterns, a pattern 3, 4 corresponding to a given power level. Thus, for the distance cell of order n and a number p of recurrences, a received power is obtained that is represented by a given level at the point (p, n) of abscissa p and ordinate n in the array.

The invention exploits the spatial and temporal statistical properties on the one hand of the ground echoes and on the other hand of the thermal noise or of the meteorological signal. In particular, the sample array of FIG. 1 shows the power distribution over the thermal noise or over an area of meteorological clutter, covering, for example, a few hundred metres to a few kilometres. In this case, if a statistical measurement is performed at a given instant over several distance cells or in a given distance cell over several recurrences, the same power distribution of the received signal is obtained, in particular the same average power.

On the axis 1 of the recurrences, in a given distance cell, a power fluctuation in time is observed which is caused by the progressive modification of the aggregation of the contributions of all the hydrometeors contained in this distance cell. Given the low recurrence frequency for example, the decorrelation is almost total from one recurrence to another. The process is generally Gaussian, and the power then follows a "Chi-squared" law with two degrees of freedom.

On the axis 2 of the distance cells, at a given instant, a spatial power fluctuation is observed due to the fact that, although the medium is locally homogenous, it is made up of a very large number of reflectors that are distributed randomly, in particular from one distance cell to another. Consequently, the aggregation of the various radiofrequency contributions is random. On the other hand, the statistical parameters, such as, for example, the average, the variance or the higher order moments notably, are spatially stationary.

FIG. 2 shows the array of samples with the same system of axes 1, 2 in the case of ground clutter echoes. In this case, unlike that of meteorological clutter or thermal noise, an analysis performed in time, for a given distance cell, does not give the same statistic as an analysis performed by distance, at a given instant.

The temporal fluctuation in a given distance cell is caused by the same phenomenon as in the previous case. It is due to the progressive modification of the way in which the various contributions are aggregated over time, within a given distance cell. As previously, the process is generally Gaussian if the number of contributors is high. The power is thus a "Chi-squared" law with two degrees of freedom.

On the other hand, the statistical spatial properties are not stationary. They vary from one distance cell to another. In particular, the power average, the standard deviation and the higher order moments vary according to the spatial dimension. This is notably due to the inevitable non-uniformity of the ground or even, for example, to masking effects.

The invention advantageously exploits the spatial non-stationarity of the statistical parameters of the ground clutter. As will be shown herein below, the invention uses, for example, the power average p to perform a filtering (average) by a temporal processing operation then by an analysis of stability in space of this average. Similarly, the discrimination could be made by using the variance of the power or another statistical parameter.

FIG. 3 illustrates, by way of example, the temporal average power distribution by distance cells for a meteorological signal and for a signal originating from a ground clutter in a system of axes in which the abscissa axis represents the distance cells and the ordinate axis represents the temporal average power p(t). A first curve 31 represents the average power of the meteorological signal. A second curve 32 represents the average power of the ground clutter.

FIG. 4 takes up the curve 31 again representing the temporal average power of the meteorological signal in the same system of axes with a sliding window 41 over the distance cells. If a cell 42 contains only an echo of the weather type, a Gaussian process is measured because of the statistical uniformity of the water droplets notably. If, moreover, the average is measured over several cells via the sliding window 41, a substantially constant average value is obtained with a decorrelation from one recurrence to another, or a time ΔT later. This average taken via the sliding window gives a tendency towards the constant average value by eliminating all the fluctuations since all the non-uniform phenomena are eliminated. The temporal fluctuation of the echo is not a signing factor, in other words, it does not constitute a discriminating function, it therefore does not carry any signature. On the other hand, the spatial variability of the temporal statistical parameters is a signing factor. In particular, the invention exploits the spatial non-stationarity of the statistical parameters of the ground clutter.

FIG. 5 illustrates the profile of a ground clutter. More in particular, it shows, by a curve 51, of the same type as the curve 32 of FIG. 3, the backscattered average power P as a function of the distance cells. In this case, the radar lights the ground, which is never completely flat. The sliding window 41 is placed around a given element 52 of space. If N pulses are transmitted to this element, there is also a Gaussian process, but the average value of the reflected power tends towards a local average value. The integration of the average value, for all the points on the ground, by the sliding window 41, tends towards the backscatter profile of the ground as illustrated by the curve 51 of FIG. 5. The dependence due to time can be eliminated by a temporal integration, so as to retain only the spatial dependence. It is thus possible to discriminate the meteorological echoes which are locally constant from the spatial point of view from the ground echoes which vary locally. This local spatial variation is notably illustrated around the point 52 of FIG. 5, since the ground is never completely flat as recalled previously.

Exploiting the fact that the temporal fluctuation of the meteorological echoes is not a signing factor, but that the spatial variation of the temporal statistical parameters is a signing factor, the method according to the invention can implement the possible steps described herein below.

Initially, for each spatial observation position, for example for each distance cell, estimations are made of the average of the reflected power, or of its standard deviation or of any other statistical parameter. The power calculation is notably easy because, generally, in certain types of radar, a post-integration is employed over a number P of recurrences which is designed to limit the temporal fluctuation effect of the echoes. The power estimation can thus be the pick of a "Chi-deux" law with two degrees of freedom, the average of which is the average value of the signal for which an estimation is required. FIG. 3 described previously illustrates the temporal averages, by the curves 31, 32, obtained by such a post-integration. The curve 32 corresponding to the ground echoes is distinguished from the curve 31 corresponding to the meteorological echoes by the nature of its spatial fluctuation.

FIG. 6 illustrates other profiles, always obtained by a post-integration as described previously. A first curve 61 illustrates the backscatter profile in average power of the meteorological echoes and a second curve 62 illustrates the backscatter profile in average power. Unlike the curves 31, 32 of FIG. 3 where the two types of echoes have substantially the same power, in the example of FIG. 6, the ground echo 62 is weaker on average by approximately a factor of 3 compared to the meteorological echo 61. However, the peaks 63, 64 of the ground echo are greater.

The profile curves of FIGS. 3 and 6 show that, in the test of discrimination of the ground echoes and of the meteorological echoes, it is necessary to dispense with a scale factor that is a priori unknown so as to retain only the fluctuation terms. One simple means of dispensing with this unknown scale factor is to work in logarithmic scale as illustrated by FIG. 7 where the curves 61', 62' respectively represent the logarithmic scale profiles of the meteorological echoes and of the ground echoes.

Furthermore, this discrimination method offers the benefit of highlighting in particular the weak ground echo values corresponding to radiofrequency mask effects. It is thus possible to calculate a statistical parameter $Y_{icd}$ for each distance cell icd and over a sliding horizon 41 of Q distance cells, $Y_{icd}$ being given by the following equation:

$$Y_{icd} = \log\left(\frac{1}{Q}\sum_{i=-\frac{Q}{2}}^{\frac{Q}{2}} X_{i+icd}\right) - \frac{1}{Q}\sum_{i=-\frac{Q}{2}}^{\frac{Q}{2}} \log(X_{i+icd}) \qquad (1)$$

$X_{i+icd}$ being an estimation of the temporal average power in the distance cell of order i+icd.

This operation amounts to calculating in a sliding manner the logarithm of the local average of the powers minus the local average of the logarithms of the powers. It is possible to check that a multiplying factor applied to $X_{i+icd}$ is cancelled out in the calculation of the equation (1).

In the preceding example, the following are obtained:
on a meteorological signal or on thermal noise, $Y_{icd}$=0.01 (in a perfectly uniform medium and if the estimation of the temporal averages was perfect, $Y_{icd}$=0 would be obtained);
on a ground signal: $Y_{icd}$=0.32 for example.

The recognition of the type of clutter is thus based on the comparison of a statistical parameter with a threshold:
insensitive to the average power;
sensitive to the degree of spatial non-stationarity of the ground clutter.

The spatial analysis can be performed along a distance axis, therefore on a single dimension. In the case of a radar performing a scan of the space, the signals received on each recurrence are post-integrated for each distance cell in turn as a function of the scan speed or of the aperture of the antenna beam. This post-integration ensures that the temporal fluctuation of the echoes present in a distance cell will be eliminated.

A spatial map is then obtained in which the variations mainly represent the spatial non-uniformities of the various types of clutter. For example, a scan bearing-wise at a given elevation angle provides a distance-bearing image of the spatial fluctuations of the various types of clutter encountered.

The cloud formations generally present a reflectivity profile in level curves 81, 82 as illustrated by FIG. 8. These level curves correspond to minimal gradient paths. It may therefore be more advantageous to perform the analysis of the fluctuations not on radial straight lines along a distance axis, but after having determined two-dimensional curves of more or less elliptical shape, the fluctuation of which is minimal, after having first eliminated the scale terms by employing a logarithmic compression of the power levels. In the presence of meteorological clutter, the search for such curves culminates in certanotably curves presenting a minimum of fluctuation. In the presence of ground clutter, all the curves supply fluctuations of the same order.

The invention claimed is:

1. Method of eliminating ground echoes received from a predetermined area by a radar, the radar illuminating the predetermined area for a predetermined number R of transmission recurrences and over a predetermined number P of distance cells, wherein the method comprises the steps of:
    calculating a spatial statistical parameter of cluttered echoes received by the radar in response to recurrences over an analysis path for distance cells; and
    comparing a spatial variation level of the spatial statistical parameter along the analysis path, wherein the echoes are determined to be ground echoes when a level of the spatial variation is greater than a predetermined threshold.

2. Method according to claim 1, further comprising the step of calculating the spatial statistical parameter successively over a window centered on a distance cell, wherein the window comprises a sliding window along the analysis path.

3. Method according to claim 2, wherein the temporal average power is calculated over substantially all the distance cells of the sliding window.

4. Method according to claim 2, wherein the spatial statistical quantity is calculated over a sliding window centered on a distance cell of order icd, wherein Q is a number of distance cells in the sliding window.

5. Method according to claim 1, further comprising the steps of:
    integrating temporally the spatial statistical parameters, successively calculated over substantially all the illuminated area, to produce a signal used in the step of calculating; and
    comparing a level of variation of the integrated signal to a predetermined threshold.

6. Method according to claim 5, wherein the step of integrating temporally is calculated over substantially all the R recurrences.

7. Method according to claim 1, wherein the calculated spatial statistical parameter comprises a temporal average of a locally reflected power.

8. Method according to claim 7, wherein the temporal average is an average of received power at a level of a distance cell.

9. Method according to claim 1, wherein the spatial statistical parameter is determined in accordance with the following relationship:

$$Y_{icd} = \log\left(\frac{1}{Q}\sum_{i=-\frac{Q}{2}}^{\frac{Q}{2}} X_{i+icd}\right) - \frac{1}{Q}\sum_{i=-\frac{Q}{2}}^{\frac{Q}{2}} \log(X_{i+icd})$$

wherein:
    $Y_{icd}$ is the spatial statistical parameter;
    $X_{i+icd}$ is a temporal average power received at a level of a distance cell of order i+icd; and
    Q is a number of successive distance cells over which the spatial statistical parameter is calculated.

10. Method according to claim 1, wherein the analysis path is situated on a distance axis of the radar.

11. Method according to claim 1, wherein the analysis path comprises a multidimensional path over which the spatial variation level is less than a predetermined value.

* * * * *